Feb. 21, 1928.
W. H. SMYTH
HIGH SPEED TRACTOR
Original Filed July 8, 1922
1,660,101
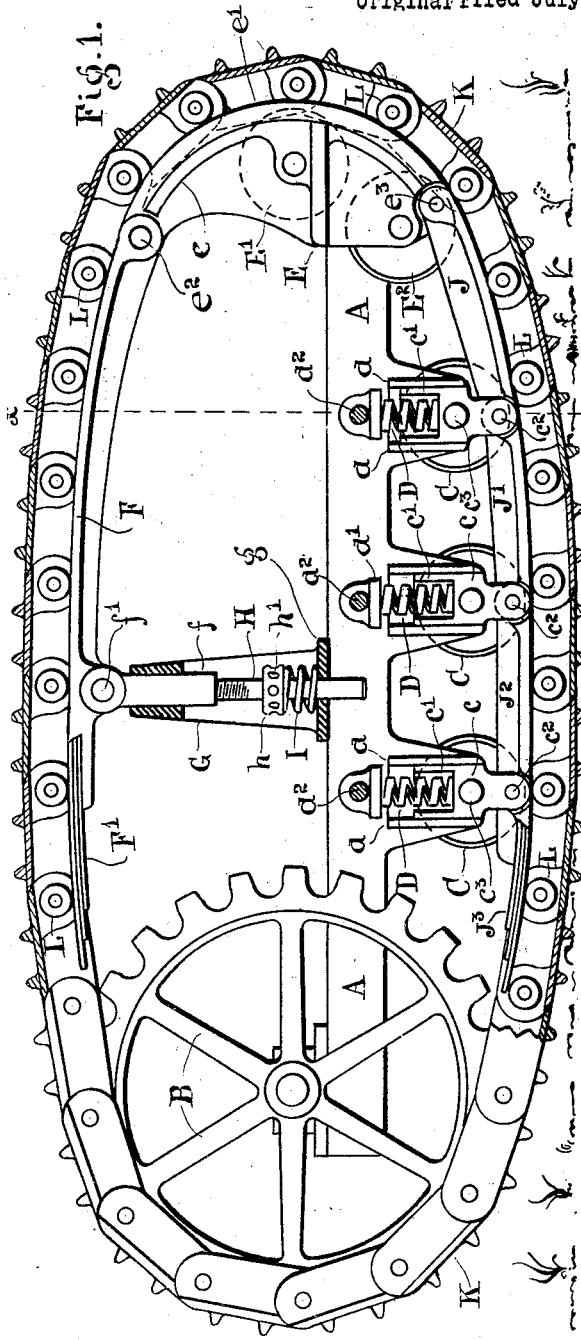
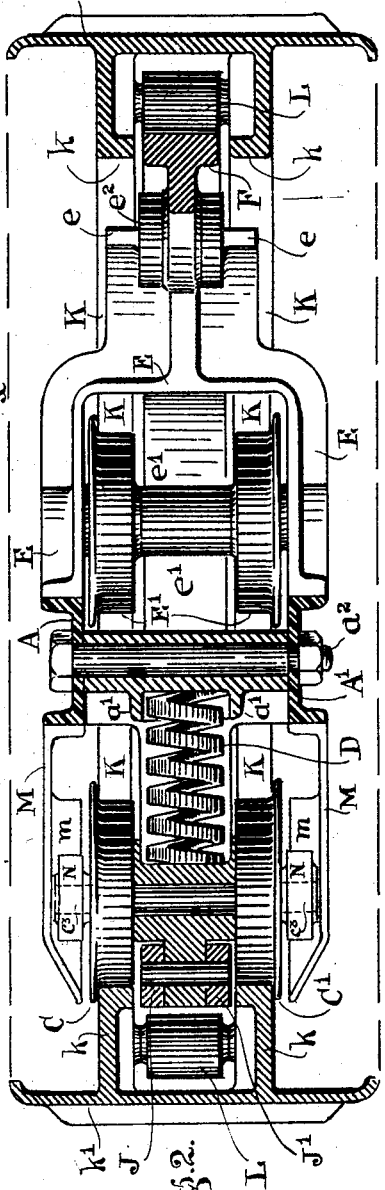
WITNESSES
INVENTOR
William H. Smyth Patented Feb. 21, 1928.

1,660,101

UNITED STATES PATENT OFFICE.

WILLIAM H. SMYTH, OF BERKELEY, CALIFORNIA.

HIGH-SPEED TRACTOR.

Application filed July 8, 1922, Serial No. 573,533. Renewed July 25, 1927.

My invention relates to self-laying-track vehicles, and has to do with means to prevent kinking of the endless track especially in the ground run of the chain, and other improvements in this art with the ultimate object of providing such an arrangement in this type of vehicle that will permit of its being run at a high speed of travel without undue wear and tear or waste of power.

Under present practice the endless trackchain type of motor vehicle is costly compared to the "round wheeler", its practical speed is slow, its upkeep is high, and its repair and general running expense is excessive.

Thus the many advantages of this character of motor vehicle are restricted to uses in which, like the processes of agriculture, slowness in speed of travel is not undesirable.

The capability of climbing steep mountain grades which characterizes the tracklayer tractor would peculiarly adapt it to fast freighting, artillery gun-mounts and the like services were it not for the tracklayer tractor's slow speed and excessive upkeep expense when used at even moderate speeds. Thus there exists an ever-growing demand for a tractor possessing the climbing capability of the endless chain-track motor vehicle and having also the speed capability of the round wheel tractor. One object of the present invention is to provide a simple, cheap, and practical self-laying-track vehicle capable of these requirements; that is to say to provide a track-layer motor vehicle possessing practically the speed capability of the round wheel tractor.

A typical expression of my invention is represented in the accompanying drawing wherein:

Fig. 1 shows a side view, portions in section for better illustration;

Fig. 2 shows (on enlarged scale), a section on the dotted line $x$—$x$ of Fig. 1.

The track-chain-assembly alone distinguishes the self-laying-track type from the "round-wheeler" form of vehicle. The common power element and framework being substantially unaffected as to construction, by my invention, and their construction being within the common knowledge of mechanics skilled in this art, I will hereinafter, confine my description to those parts directly affected by my invention, for simplicity in the drawing with enhanced clarity in the specification. But, in what follows, it is to be understood, in drawing, description, and claims, that the sprocketed powerwheel and indicated frame, as designated and illustrated, are intended to represent, not alone a power-wheel but the motor element complete with steering means and suitable frame and power connections between the motor element and the track-chain-assembly.

With this understanding $A$—$A^1$ indicate suitable framework pertaining to a self-laying-track motor vehicle provided with one or duplicate track-assemblies. B is a powerwheel, with circumferential teeth or sprockets, journalled on the frame $A$—$A^1$. Vertical guides $a$, $a$, are provided on frame $A$—$A^1$ and between these guides are vertically movable journal boxes $c$, $c$, in which are journalled load-bearing concentrically arranged pairs of wheels $C$—$C^1$ to carry the weight of the machine.

Abutments are secured to the framework $A$—$A^1$, shown as sockets $a^1$, $a^1$, held in position by struts $a^2$, $a^2$, bolted to the framework $A$—$A^1$. Corresponding sockets $c^1$, $c^1$, are provided in the upper part of the boxes $c$, $c$, and a load-bearing spring D is interposed between each frame-socket $a^1$, and its co-acting journal-box-socket $c^1$, to resiliently sustain the weight of the machine.

At the forward end of frame $A$—$A^1$ and secured thereto is a bifurcated chain-guide bracket E preferably provided with a laterally extended curved flange $e$, and a centrally disposed curved track $e^1$. Journalled in the bracket E, are shown track-chain guide-wheels $E^1$, $E^2$, similar to machine supporting wheels $C$, $C$, $C$, all of which are preferably flanged track-wheels.

Hinged at $e^2$, to the upper end of bracket E is a continuous support guide-rail F, which extends rearwardly towards the sprocket-wheel B. The guide-rail F at its rearward end may be provided with a leaf spring $F^1$, which extends from the end of F to a point adjacent to the teeth of the sprocket-wheel B.

An adjustably resilient tension means G is provided to automatically take up the slack of the endless track-chain. As shown in Fig. 1, it consists of a suitable standard which rests upon and is secured to the frame $A$—$A^1$ by a base flange $g$; a vertically adjustable bolt H, screws into a sliding member $f$ in the upper end of the standard and the member $f$ is loosely hinged to the guide-rail F. Secured upon the bolt H, is an abutment $h$ provided with lever-socket holes $h^1$ to facilitate adjustment; and interposed between this abutment $h$ and the flange $g$ is a spring I.

To the lower end of bracket E, at $e^3$ is hinged rail-bridge or antikink-track J, its other end being flexibly connected to a downward extension of the forward journal-box $c$ at $c^2$; another bridge-rail $J^1$, is hinged at the same point $c^2$, its other end, like J, is flexibly connected to the next journal-box $c$; and a third rail-bridge $J^2$, similarly connects the remaining journal-box $c$. The rail-bridge $J^2$, is preferably provided with a resilient extension which I have shown in Fig. 1, as a leaf-spring $J^3$. The thus united rail-bridges $J^3$, $J^2$, $J^1$, and J constitute an unbroken resiliently flexible continuation of the centrally disposed track $e^1$ and the guide-rail F, and unitedly form a continuous trackway.

A track-chain K, with twin-tracks $k$, $k$, and tread-plates $k^1$, as commonly used in this art, is suitable to co-act with the foregoing specified mechanisms, with the addition of suitably disposed anti-friction rollers, substantially as I have shown the rollers L, L, in Figs. 1 and 2. In Fig. 1 I have indicated such a chain, but as the details of construction are within the knowledge of those skilled in this art, the particular form of this chain is left to their judgment guided by the requirements of the circumstances under which my invention is to be used. In Fig. 1 a suitable track-chain is shown in outline and in Fig. 2 it is shown in section. In the latter figure of the drawing it will be noted that while the roller L is in continuous rolling contact with the guide-rail F, the lower anti-friction roller L is shown out of contact with the rail-bridge with which it co-acts, though closely adjacent thereto. The purpose of this arrangement is that immediately below the contact point of each of the load-bearing wheels C—C—C, there is no load upon the antifriction rollers journalled on the chain, which rollers, as shown in Fig. 2, may be entirely out of contact with the guide-rail $J^1$—$J^2$, or in light non-load-bearing contact as indicated in Fig. 1. The load of the machine is borne on the massive wheels C—C—C not on the light, small-diameter antifriction rollers. The effect of this construction and arrangement is to separate the load-bearing function and duty (of carrying the ponderous machine), from the non-load-bearing function and duty of reducing the friction of the chain-track in its travel.

In Fig. 2 I have also shown a strong protective apron or mud-guard M, which may be attached to and extend the full length of the frame A—$A^1$.

As the motor moves forward in operation, the upper run of the endless track-chain is carried upon the anti-friction rollers L, L, rolling smoothly upon the guide-rail F, thus preventing any catenary sag in the upper run of the endless track-chain, and its consequent vibration at high speeds. The rail-heads of the twin-tracks straddle the guide-rail and are thus prevented from lateral displacement. The endless track-chain thence passes around the curved guide bracket E, the curved track-rib $e^1$ of which serves the anti-friction rollers L, L, as a rail-continuation of the guide-rail F. The massive flanged wheels $E^1$, $E^2$, relieve the small anti-friction rollers L, L, of heavy duty as the track-chain travels downward towards and along its lower stretch or ground run.

Between the flanged wheels $E^2$ and the first pair of load-supporting wheels C—$C^1$, the rail-bridge J forms a resiliently flexible kink-preventing continuation of the track-rib $e^1$ for the anti-friction-roller-carried endless track-chain at the beginning of its ground run; and similarly $J^1$, $J^2$, and $J^3$ constitute a continuous unbroken trackway for the anti-friction rollers between the peripheries of the flanged wheels $E^2$ and the sprocket-wheel B, bridging the gaps between the track contact points of the successive bearing wheels, and between these and sprocket-wheel B.

The endless track-chain being thus progressively laid upon the ground, the motor parts including the power sprocket-wheel B and frame A—$A^1$, travel forward thereon, being resiliently supported upon the flanged wheel-pairs C—$C^1$ and being power-actuated by the engagement of the sprocket-wheel teeth with the anti-friction abutment-rollers L, L, of the track chain K.

On the ground run of the track-chain K, the spring-pressed wheel-pairs C—$C^1$ are the weight support means which bear the load of the machine. The rollers L, L, practically function only as anti-friction means in contradistinction to heavy-duty load support, and in passing beneath the load-support wheels do not normally contact with the rail-bridges $J^1$, $J^2$, but merely prevent the track-chain K, from kinking in the space between the peripheral contact points of the wheels with the track-chain K, when rocks or ground obstructions are encountered which would kink the chain K were the rail-bridges absent. This is shown in Fig. 2 where space appears between the roller L, and the sectioned rail-bridges marked J, $J^1$, to which lack of contact I earlier made particular reference.

Resilient tension is maintained upon the track-chain K, by the adjustable support G, and the resilient ends $F^1$, and $J^3$ locally tension the upper and lower runs of the trackchain K adjacent to the sprocket-wheel B, and in addition to their other functions serve to lead the chain on to and off the sprocket-wheel smoothly and without the jerk which is usual at these points.

When the rollers N, N, and their co-acting guides m, m, are employed, these serve as anti-friction roller guides for the wheels C—C¹, in their vertical movement and assist the guides a, a, and slidable journal-boxes c, c, c, in the performance of this function.

Under the best and most successful practice, prior to my invention herein set forth, two distinct types of tracklayer-tractor construction have been developed: in one, separately movable load-bearing-trucks are interposed between the sprocket-wheel and idler-wheel; and in the other, the sprocket-wheel, idler-wheel and the load-bearing wheels are directly journalled in the same frame. In both of these types the load-bearing wheels are as numerous and crowded together as closely as possible, in vain endeavor to avoid the destructive kinking effect. In both types, in spite of the multiplication and crowding of the support wheels, the track-chain sharply kinks between all the wheel peripheral points of track contact.

I therefore desire to cover and control it broadly together with such modifications as will readily present themselves to the minds of skilled mechanics in the light of the foregoing teachings, and without other limitations than may be rightfully defined by a liberal interpretation of the following claims.

I claim—

1. A tractor comprising a motor-carrying frame, an endless-track chain its lower run adapted to ground support, antifriction rollers journaled on the chain below its track surface, supporting wheels travelable upon the ground-run of the chain, rail members coacting with the antifriction rollers to limit the flexure of the track between the wheel peripheries, and springs adapted to cushion the support wheels and rail members.

2. A tractor comprising a motor-carrying frame, an endless-track chain its lower run adapted to ground support, load-bearing wheels journaled in spring-controlled journal-boxes on the frame, and rail-members hinged to the journal-boxes adapted to coact with the ground-run of the chain to limit its flexure between the peripheries of the bearing wheels.

3. In a self-laying-track motor vehicle supported upon track wheels travelable upon the lower run of the track, hinged rail members adapted to coact with the ground run of the track to limit its flexure between the peripheries of the supporting wheels.

4. In a self-laying-track vehicle a frame, an endless-track chain with antifriction rollers journaled thereon, spring-pressed wheels journaled on the frame to support the vehicle and an adjustable continuous support guide rail paralleling the upper run of the chain upon which rail the antifriction rollers are travelable in peripheral contact.

5. In a self-laying-track vehicle, a motor-carrying frame, an endless-track chain with antifriction rollers journaled thereon, spring-pressed wheels journaled on the frame to support the vehicle and a spring-pressed continuous support guide-rail paralleling the upper run of the chain upon which rail the antifriction rollers are travelable in peripheral contact.

6. In a self-laying-track vehicle, a bridge rail comprising spring pressed flexibly hinged sections coacting with the lower run of the track to resiliently control its flexure.

7. In a motor vehicle, a frame for the motor, a power-wheel journaled on the frame near its rear end, curved track means on its front end with an upper continuous support guide-rail and a lower run hinged bridge rail, an endless-track chain encircling the power-wheel and curved track, supporting wheels journaled on the frame travelable upon the ground run of the chain and antifriction rollers journaled on the chain travelable in rolling contact on the guide rail to continuously support the upper run.

8. In a motor vehicle, an endless twin-track-chain its lower run adapted to ground support, a plurality of spring-pressed independent vertically movable pairs of wheels travelable upon the lower run of the twin-track-chain to support the device, and antifriction rollers journaled upon the chain below its track surface adapted to limit the flexure of the chain.

9. A tractor comprising a motor carrying frame, an endless-track chain its lower run adapted to ground support with antifriction rollers journaled thereon below its track surface, track-wheels journaled on the frame travelable on the ground run of the track chain, a power-driven sprocket-wheel with coacting curved-track bracket around which the track chain travels, a guide-rail coacting with the chain rollers to support the upper run of the chain, and a flexible bridge-rail coacting with the chain rollers to control the flexure of the ground run of the endless-track chain.

WILLIAM H. SMYTH.